United States Patent
Leichliter

[11] 3,749,214
[45] July 31, 1973

[54] VISCOUS COUPLING HAVING AN IMPROVED COOLANT SYSTEM

[75] Inventor: Wayne K. Leichliter, Marshall, Mich.

[73] Assignee: Eaton Corporation, Cleveland, Ohio

[22] Filed: Nov. 26, 1971

[21] Appl. No.: 202,209

[52] U.S. Cl. ......... 192/58 B, 123/41.46, 192/113 B
[51] Int. Cl. ....................... F16d 35/00, F16d 13/72
[58] Field of Search....................... 192/58 B, 113 B; 123/41.46

[56] References Cited
UNITED STATES PATENTS

| | | | |
|---|---|---|---|
| 3,661,237 | 5/1972 | Thompson.............. | 192/58 B |
| 3,007,555 | 11/1961 | Eames.................. | 192/113 B X |
| 2,699,846 | 1/1955 | Pitman et al.......... | 192/58 B |
| 2,284,938 | 6/1942 | Allen, Jr.............. | 123/41.46 |
| 2,294,207 | 8/1942 | Roberts................ | 192/113 B X |
| 2,852,118 | 9/1958 | Lacroix, Jr. et al..... | 192/113 B |
| 3,062,347 | 11/1962 | Hornbostel............ | 192/113 B |
| 3,505,982 | 4/1970 | Walter et al. ......... | 192/113 B |

*Primary Examiner*—Allan D. Hermann
*Attorney*—Thomas L. Tarolli et al

[57] ABSTRACT

A viscous coupling apparatus includes relatively rotatable input and output members configured so as to define a shear space therebetween so that the viscous fluid in the shear space transmits torque between the members. The transmission of torque results in the generation of heat. One of the members has a chamber for receiving a coolant medium for dissipating at least a portion of the generated heat. Means are provided for effecting substantially continuous flow of the coolant medium into and out of the chamber during transmission of torque and this means includes an inlet conduit for directing the coolant medium into the chamber and a separate outlet conduit for directing heated coolant medium from the chamber.

7 Claims, 3 Drawing Figures

VISCOUS COUPLING HAVING AN IMPROVED COOLANT SYSTEM

This invention relates to the art of viscous couplings and, more particularly, to a viscous coupling having an improved cooling system.

Viscous couplings are well known and typically include relatively rotatable input and output members configured so as to define a shear space therebetween so that viscous fluid in the shear space transmits torque between the members. Such a coupling is commonly used for driving a cooling fan associated with the engine of an automobile. With the increased horespower of automobile engines, as well as the reduced frontal or ram air area and the use of smog control heat loads, automobile engine fan cooling requirements have been increased.

A significant problem in conjunction with modifying the design of viscous couplings to handle higher fan cooling requirements is the dissipation of heat generated by the transmission of torque between the input and output members of viscous couplings. As the temperature of a viscous coupling increases, the viscosity of the fluid in the shear space between the input and output members decreases, and, consequently, a greater shear area is required to transmit an equivalent amount of torque. By maintaining the viscous coupling at a lower temperature, it is possible to provide greater torque carrying capacities in the coupling by maintaining the viscous fluid at a higher viscosity. In addition, the life of viscous fluid and bearings associated with the coupling is increased when the viscous coupling is effectively cooled.

The present invention contemplates the provision of a viscous coupling employing relatively movable input and output members configured so as to define a shear space therebetween. Viscous fluid contained in the shear space serves to transmit torque between the members during relative rotation thereof, with the transmission of torque resulting in the generation of heat.

One of the members of the viscous coupling has a chamber for receiving a coolant medium for dissipating at least a portion of the generated heat, such as disclosed in copending application Ser. No. 878,136 now U.S. Pat. No. 3,661,237.

In accordance with the present invention, means are provided for effecting substantially continuous flow of the coolant meduim into and out of the chamber during transmission of torque. This means includes an inlet conduit for directing coolant medium into the chamber and a separate outlet conduit for directing heated coolant medium from the chamber. Moreover, the coolant circulating means includes a pump in fluid communication with the inlet and outlet conduits so as to provide a pressure differential to assure positive pumping of the coolant medium into and out of the chamber.

The coolant receiving chamber is defined by walls configured so that a primary heat transfer zone is located closer to the outlet from the chamber than to the inlet thereof, and the fluid flows across the wall area defining the primary heat transfer zone immediately prior to exiting from the chamber. Moreover, the coolant receiving chamber is divided by a flow directing baffle, and the cooling medium is directed into the coolant receiving chamber on one side of the baffle, flows around the baffle, flows through the primary heat transfer zone on the other side of the baffle and then exits from the chamber. All of which, provides for a positive flushing action in the coolant receiving chamber.

As the coolant medium, a water glycol (anti freeze) mixture, contacts the primary heat transfer area, certain amounts of the water vaporize, thereby absorbing a large amount of heat due to the change in state of the water. The glycol remains a liquid to a much higher temperature than water at an equivalent pressure, and an accumulation of glycol liquid in contact with the primary heat transfer zone would substantially destroy the phase change cooling effect by a change in state of the water. The positive pumping pressure and the flushing action provided by the present invention, prevent any substantial accumulation of glycol (anti-freeze) in the coolant chamber and assure a continuous effective heat transfer by vaporizing water flowing through the coolant receiving chamber.

Consequently, it is an object of the present invention to provide an improved viscous coupling constructed so as to dissipate heat generated by the coupling during transmission of torque with the heat being dissipated by recirculation of a coolant medium into and out of a coolant receiving chamber in one of the viscous coupling members in positive effective manner which prevents substantial accumulation of glycol in the coolant receiving chamber.

A still further object of the present invention is to provide improved means for cooling a viscous coupling by providing a positive pressure pumping of coolant into and from a heat exchange chamber located in one of the viscous coupling members and an effective flow of the fluid through the chamber to provide a positive flushing of the chamber by the fluid flow.

The foregoing and other objects and advantages of the invention will become more readily understood from the following description of the preferred embodiment, taken in conjunction with the accompanying drawings in which.

Figure 1:
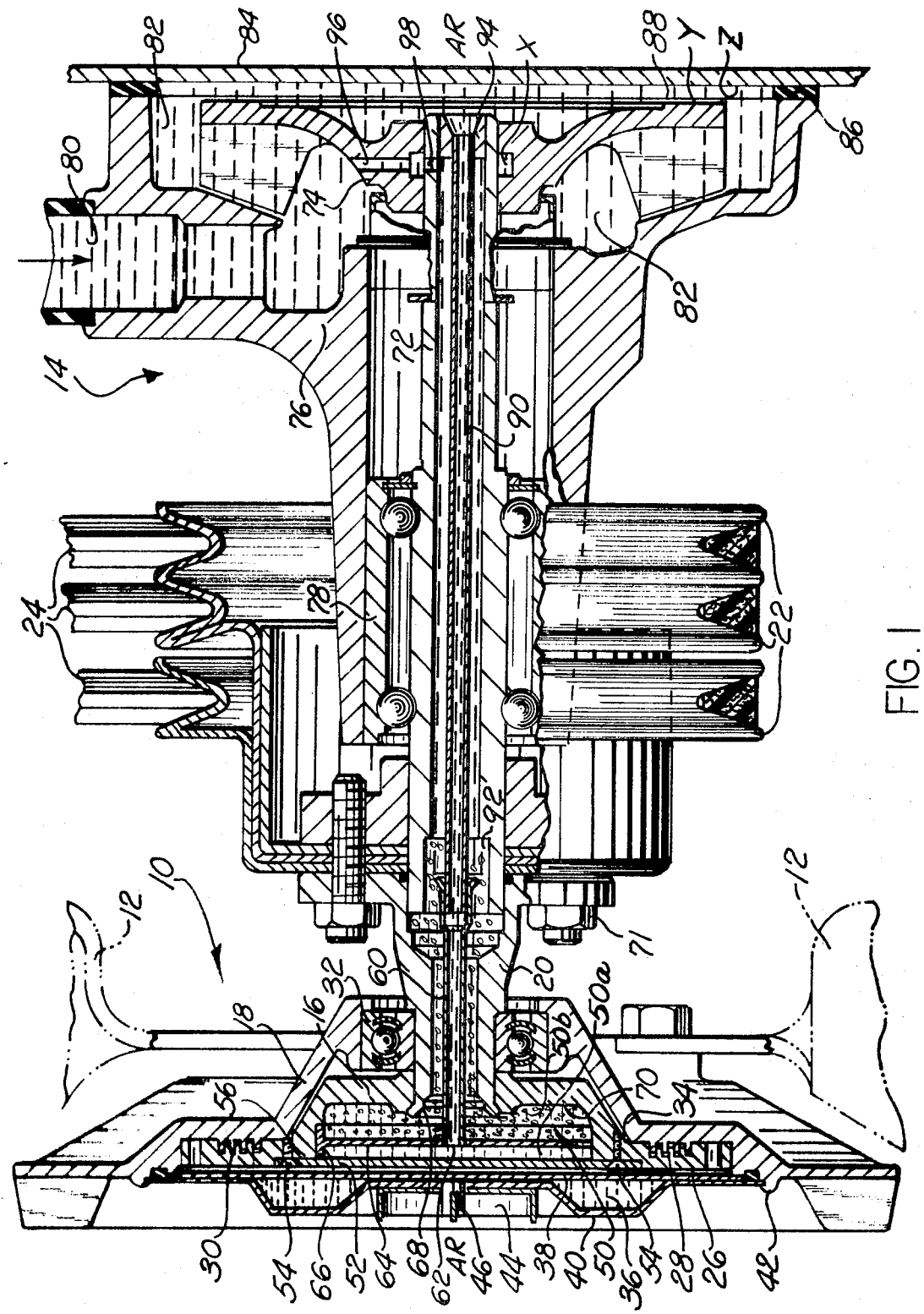
FIG. 1 is a cross sectional view of an apparatus embodying the present invention.
Figure 2:
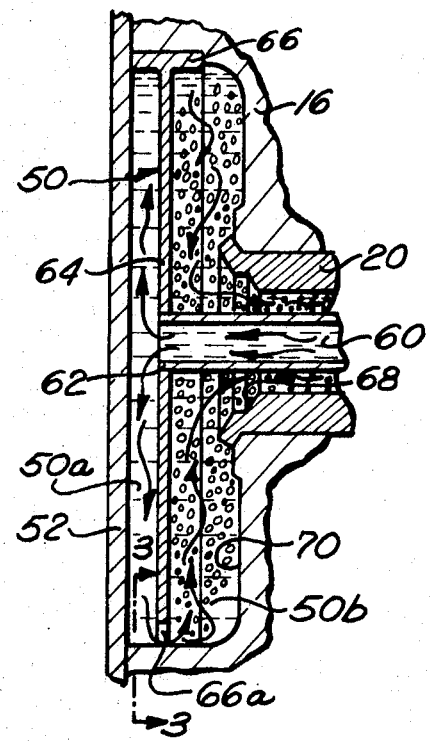
FIG. 2 is an enlarged view of a portion of the apparatus of FIG. 1.

Referring now to the drawings, there is illustrated the presently preferred embodiment of the present invention as comprising a viscous coupling 10 used in conjunction with driving a fan 12 of an internal combustion engine, such as that of an automobile. It is contemplated that the internal combustion engine be provided with a water pump, partially shown at 14, to circulate a cooling medium, such as a mixture of water and antifreeze, around the engine to absorb heat created by combustion in the engine, in a conventional manner. It is also contemplated that the internal combustion engine be provided with a radiator which, in a conventional manner, employs a plurality of thin tubes through which the cooling medium flows. Air (ram air) is forced through the radiator to cool the cooling medium which is then recirculated by the water pump 14 through the engine. The air is forced through the radiator due in part to the forward movement of the vehicle as the exposed frontal area thereof allows air to flow through the radiator in accordance with the speed of the vehicle. Fan 12, in a conventional manner, serves to assist movement of air through the radiator, and at lower speeds the fan is required to move more air through the radiator. As is known, one characteristic of viscous coupling is that the rotational output speed of the coupling will not increase proportionately with an increase in the input speed of the coupling. Consequently, as the speed of the vehicle increases the fan is not driven at a proportionately increased speed. This characteristic takes advantage of the fact that at higher vehicle speeds fan speed can tail off due to the higher ram air flow through the radiator.

The viscous coupling 10 includes an input coupling member 16 and an output coupling member 18 which are relatively rotatable about a common axis of rotation AR. The radiator fan 12 is suitably secured to output member 18 and rotates therewith about the axis of rotation AR. Input member 16 is drivingly connected to a drive member 20. Drive pulleys 22 are connected to the drive member 20 and belts 24 are trained about the pulleys 22. At least one of the belts is driven, as from the crankshaft of the automobile engine, to drive the fan and the other belts may function to drive other accessories.

The drive between the input and output members 16 and 18 of the viscous coupling is effected by the action of viscous shear fluid positioned therebetween. Output member 18 has a plurality of grooves 26 defined therein which receive fins 28 extending from the input member 16 in a conventional manner. The opposing surfaces of members 16 and 18 are spaced slightly to provide a fluid shear space therebetween. This space is, for all practical purposes, confined to the area of grooves 26 and fins 28 so as to define an annular shear space 30 which is coaxial about axis of rotation AR. Viscous fluid is contained in this shear space so that when input member 16 is rotated the viscous fluid transmits torque to the output member to which the fan 12 is secured. The output member 18 is rotatably mounted on drive member 20 by a suitable bearing 32 so that the output member may rotate relative to the input member about axis of rotation AR.

The annular shear space 30 represents a portion of a working chamber 34 containing viscous fluid. The input member 16 rotates in this working chamber 34 and, as is well known, the amount of torque transmitted from the input member to the output member 18 is a function of the volume and viscosity of the fluid in chamber 34 and, more specifically, in the shear space 30. In the event that fluid is not located in the shear space, no torque will be transmitted between the input and output members. Preferably, coupling 10 employs means to vary the volume of fluid in working chamber 34 including means providing fluid flow into and out of the working chamber from a reservoir chamber 36. Reservoir chamber 36 is defined by a plate 38 and a disc-shaped cover 40 which are secured to output member 18 as by rolling over an annular lip portion 42 of the output member to secure plates 38 and 40 in position. Means are provided for effecting fluid flow between chambers 34 and 36. This means, for example, may be constructed as shown in the U.S. Pat. to A. Sutaruk No. 3,263,783, assigned to the same assignee as the present invention. Briefly, such a fluid control means includes a helically wound bimetallic temperature responsive coil 44 having one end positioned in a slot formed in a stub shaft 46 rotatably supported by cover plate 40 coaxial with axis of rotation AR.

During the transmission of torque between input member 16 and output member 18, the viscous fluid in shear space 30 is sheared. This generates heat and the heat decreases the viscosity of the viscous fluid. As the viscosity decreases, the coupling transmits less torque and, hence, fan 12 rotates at a proportionally slower speed with respect to the speed of the motor. In order to dissipate the generated heat, one of the coupling members is constructed so as to be liquid cooled. As depicted in the embodiment illustrated herein, the input coupling member 16 is configured so as to define a chamber 50. As will be developed in greater detail hereinafter, this chamber serves to receive cooling medium, such as a mixture of water and antifreeze, from a suitable supply source, such as the radiator associated with an automobile engine. This cooling medium is vaporizable at the normal operating temerature of coupling 10. Chamber 50 is closed by a cover plate 52 as with the use of machine screws 54. An 0-ring 56 serves to provide a fluidtight seal between input member 16 and cover plate 52.

Figure 3:
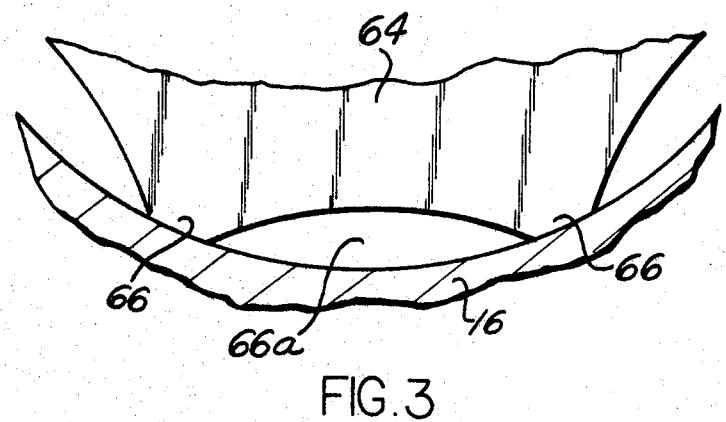
FIG. 3 is a view taken along line 3—3 of FIG. 2.

In accordance with the present invention, both an inlet and an outlet are provided for chamber 50 so that the cooling medium may be pumped into the chamber and then exit therefrom through the outlet. In the embodiment illustrated, drive member 20 is hollow defining a passageway coaxial with axis of rotation AR. Within this passageway there is provided a sleeve member 60 positioned so as to be coaxial about axis of rotation AR. Sleeve member 60 serves as the inlet conduit through which the cooling medium flows into the chamber 50. One end 62 of sleeve member 60 extends slightly more than halfway into chamber 50. A disc-shaped baffle plate 64 is secured to sleeve 60 at one end 62, as by welding. The circumferential edge of baffle plate 64 is secured at annular spaced apart locations to input coupling member 16. This is accomplished with an annular array of spaced apart flanges 66 extending from the circumferential edge of plate 64 and secured as by welding to member 16. These flanges 66 are spaced apart in an annular array so that spaces 66a (FIG. 3) are provided therebetween for the cooling medium to flow from the inlet side 50a of baffle plate 64 to the outlet side 50b thereof. The outlet conduit for chamber 50 is provided by the remaining portion of the passageway in drive member 20. Drive member 20 is provided with a flared annular opening 68 through which cooling medium exits from the chamber.

As noted, baffle plate 64 devides chamber 50 into inlet portion 50a and outlet portion 50b. In addition, the interior walls of input coupling member 16 are configured to define an annular recess 70. The outlet portion 50b of chamber 50 is substantially larger than the inlet portion and serves and the primary heat transfer zone. As the cooling medium flows over the surfaces defining the chamber portion 50b, heat is absorbed thereby and due to the circulation of the medium, the heat is removed from the viscous coupling.

The invention contemplates that a positive pressure differential be provided between the inlet and outlet conduits for chamber 50 so that the cooling medium is pumped through sleeve 60 to its open end 62 and into the inlet portion 50a of chamber 50. It is also contemplated that drive member 20 be driven about axis of rotation AR as by use of pulleys 22 driven from the crankshaft of an automobile engine so that as the cooling medium enters chamber 50 it is driven radially outward and then flows into the larger outlet portion 50b of chamber 50 through the spaces between adjacent baffle flanges 66. As the cooling medium passes through this larger portion of chamber 50 which serves as the primary heat transfer zone, heat generated by coupling 10 is transferred to the cooling medium. As the cooling medium preferably employs a mixture of water and antifreeze, the water will absorb heat and vaporize. The antifreeze concentrate, together with the water vapor, will be flushed out of chamber 50 through the outlet 68 and thence through the annular passage in drive member 20 by the positive and continuous flow of coolant around the baffle 64 and through the chamber portion 50b. Accordingly, there is no tendency for any build-up of concentrated antifreeze (glycol) in the chamber 50b. The mixture of water, water vapor and antifreeze concentrate flushed from the chamber portion 50b is recirculated through a reservoir, as with a suitable pumping means, where the water vapor will condense as it cools to restore normal dilution of the water-anitfreeze mixture before this cooling medium is then recirculated back into chamber 50 through sleeve 60.

As stated hereinbefore, it is contemplated that the viscous coupling 10 be employed for driving fan 12 in an internal combustion engine. Consequently, the coupling may be mounted so as to be driven by a pulley 22 with suitable fastner assemblies 71. The cooling system may receive a cooling medium from various reservoirs and it is contemplated that the inlet 62 and outlet 68 of chamber 50 be in fluid communication with such a reservoir and a suitable pump. In the embodiment illustrated, the reservoir of cooling medium is the radiator system of an internal combustion engine, and the pump takes the form of water pump 14. Consequently, drive member 20 is secured to a sleeve member 72, as with a press fit. The sleeve member 72 extends coaxially about axis of rotation AR and serves to carry at one end the impeller 74 of water pump 14. Impeller 74 is suitably secured to sleeve 72 as by a press fit or other suitable securing means so that as drive member 20 is driven, sleeve member 72 rotates therewith to in turn drive the impeller 74 in a known fashion. The water pump 14 conventionally includes a housing 76 which carries a suitable ball bearing arrangement 78 between a cylindrical inner wall of the housing and the outer cylinderical surface of sleeve member 72. As is conventional, the water pump housing 76 is provided with an inlet 80 for receiving the cooling medium from the radiator, as with a suitable hose, with the inlet leading to an enlarged annular chamber 82 in which impeller 74 rotates. An outlet (not shown) carries the cooling medium, as pumped by impeller 74, through the engine block and another radiator hose for recirculation. Chamber 82 is closed at one end by a suitable wall 84. A variable shaped seal ring 86 provides a seal between wall 84 and housing 76 so as to define a fluidtight space 88 between the impeller 74 and wall 84.

In accordance with the present invention, inlet sleeve 60 is secured as by a press fit to an elongated conduit member 90 which extends coaxially through sleeve member 72 and is supported at one end thereof by coiled springs 92 and at the opposite end thereof by an annular support 94. Sleeve member 90 and support 94 are flared outwardly to provide an inlet to receive the cooling medium from the chamber 82 through the space 88.

In order to provide an effective positive pressure differential between the inlet 50a and outlet 50b of chamber 50, a cross-drilled aperture 96 is provided in the impeller 74 in registry with an aperture 98 in sleeve member 72 by an annular groove X in impeller 74. Also the proper space relationship between the back surface of impeller 74 (surface Y) and surface Z of wall 84 must exist. Preferably, this aperture and impeller space relationship arrangement is sufficient to ensure at least a twenty-pound per square inch differential pressure between the inlet and outlet conduits.

In the operation of the lfuid coupling 10, heat is generated during the transmission of torque from the input coupling member 16 to the output coupling member 18. The transmission of torque results in the generation of heat which, if not dissipated, results in loss of viscosity of the viscous fluid in the working chamber containing the shear space 30. If the viscous fluid is not effectively cooled, a loss in transmission of torque will result. Consequently, in accordance with the present invention, the chamber 50 is provided in the input coupling member 16 and this chamber is partitioned by the baffle 64 so as to provide an inlet chamber portion and an outlet chamber portion. The outlet chamber portion is substantially larger than the inlet chamber portion and serves as the primary heat transfer zone. A cooling medium, such as a mixture of water and antifreeze, is circulated through chamber 50 by positive pressure flow with the use of water pump 14. This coolant medium flows into the inlet chamber portion from the inlet conduit formed by members 90 and 60. Since the input member is rotating, baffle plate 64 will assist in directing the coolant medium radially outward which will then enter the outlet chamber 50b through the spaces between adjacent flanges 66 of the baffle plate 64. As the cooling medium flows into the outlet chamber portion, heat is received from the primary heat transfer zone. Depending on the working temperature, the water will at least in part vaporize leaving concentrated antifreeze. This mixture of water vapor and concentrated antifreeze is, however, flushed out of the outlet chamber 50b due to the positive pumping and flushing action and exits from the chamber through outlet 68. Outlet 68 is an annular passageway between the inner walls of drive member 20 and the outer walls of sleeve 60. This passageway continues through sleeve 72 where the mixture of water vapor and concentrated antifreeze exits through aperture 98 in sleeve 72 and then through the cross-drilled aperture 96 in the impeller 74. During the flow of the mixture, the water vapor condenses to dilute the anitfreeze concentrate to obtain a normal mixture of water and antifreeze as the cooling medium is recirculated by the impeller 74 through the radiator of the automobile and thence directed back to chamber 50 through sleeve 90. This pumping process serves to continuously cause flushing of the concentrated antifreeze and water vapor from the outlet chamber 50b during the operation of the fluid coupling.

Although the invention has been described herein with respect to a preferred embodiment, it will be apparent to those skilled in the art that various modifications and arrangements of parts may be made to the fluid coupling and antifreeze water flushing system within the spirit and scope of the appended claims.

What is claimed is:

1. An apparatus comprising relatively rotatable input and output coupling members, said input and output coupling members defining a shear space therebetween so that viscous fluid in said shear space transmits torque between said members with said transmission of torque resulting in the generation of heat, one of said members having a chamber for receiving a coolant medium for dissipating at least a portion of the generated heat, at least a portion of said coolant medium vaporizing upon absorbing heat from said one member, inlet conduit means for directing the coolant medium into said chamber, outlet conduit means for directing the coolant medium from said chamber, means in said chamber for directing coolant medium through said chamber to provide a flushing thereof, coolant recirculating means including pump means in fluid communication with said inlet and outlet means so as to provide a positive pressure differential for pumping coolant medium through said chamber, a hollow rotatable shaft having a passageway therein for receiving coolant medium from said outlet means, said pump means including walls defining a pump chamber and an impeller mounted on said shaft for rotation in said pump chamber, and means defining a conduit through said shaft and said impeller for coolant medium to flow from said passageway through said impeller conduit to said pump chamber.

2. An apparatus as set forth in claim 1 wherein said hollow shaft is connected to said one coupling member for rotation therewith about a common axis of rotation and said impeller conduit is configured so as to be directed substantially radially outward from said shaft and through said impeller to said pump chamber.

3. An apparatus set forth in claim 1 including a tubular member mounted within said shaft for fluid communication at one end with said inlet means and at said other end with said pump chamber for receiving recirculated coolant medium therefrom.

4. A viscous fluid coupling apparatus comprising relatively rotatable input and output members configured so as to define a shear space therebetween so that viscous fluid in said shear space transmits torque between said members with the transmission of torque resulting in the generation of heat, means supporting said input and output members for rotation about a common axis, one of said members having wall means defining a heat exchange chamber for receiving a coolant medium comprising a water-glycol mixture to dissipate at least a portion of said generated heat, the water in the water-glycol mixture vaporizing in said heat exchange chamber, said shear space and said chamber being each annular and coaxial about said axis of rotation with said chamber being located radially inward from said shear space, baffle means for partitioning said chamber into an inlet chamber portion and a larger outlet chamber portion so that the latter serves as a primary heat transfer zone, said baffle means comprising a member positioned coaxially of said input and output members and having a radially extending portion which partitions said chamber, inlet means for directing the water-glycol mixture into said inlet chamber portion, said radially extending portion defining passage means for said water-glycol mixture to flow from said inlet chamber portion to said outlet chamber portion, outlet conduit means communicating with said outlet chamber portion through which said water-glycol mixture may exit from said chamber, said outlet conduit means comprising a hollow drive shaft for driving said one member and wherein said drive shaft has a passageway therethrough in fluid communication with said outlet chamber portion, and a tubular member in said passageway with said tubular member serving as said inlet means to said chamber and the remaining portion of said passageway about said tubular member serving as said outlet means from said chamber, and pump means in fluid communication with said inlet and outlet conduit means to provide a positive pressure differential to pump the water-glycol mixture therethrough and thereby minimize concentration of glycol in said heat exchange chamber where water in the mixture vaporizes.

5. An apparatus as defined in claim 4 wherein said pump includes an impeller rotatable in a pump chamber to effect said pumping action and further including means defining a conduit through said hollow drive shaft and said pump impeller for the water-glycol mixture to flow from said outlet conduit through said impeller to said pump chamber.

6. An apparatus as defined in claim 4 wherein said baffle means comprises a single disc member having spaced outer peripheral portions which engage said wall means and said passage means defined by said radially extending portion being located intermediate said spaced peripheral portions of said disc so that the water-glycol mixture flows across said wall means to thereby minimize the concentration of glycol along said wall means.

7. A viscous fluid coupling apparatus comprising relatively rotatable input and output members configured so as to define a shear space therebetween so that viscous fluid in said space transmits torque between said members with the transmission of torque resulting in the generation of heat, means supporting said input and output members for rotation about a common axis, one of said members having wall means defining a heat exchange chamber for receiving a coolant medium comprising a water-glycol mixture to dissipate at least a portion of said generated heat, the water in the water-glycol mixture vaporizing in said heat exchange chamber, said shear space and said chamber being each annular and located about said axis of rotation, baffle means for partitioning said chamber into an inlet chamber portion and an outlet chamber portion, inlet means for directing the water-glycol mixture into said inlet chamber portion, said baffle means defining passage means for said water-glycol mixture to flow from said inlet chamber portion to said outlet chamber portion, outlet conduit means communicating with said outlet chamber portion through which said water-glycol mixture may exit from said chamber, and inlet conduit means for directing said water-glycol mixture to said inlet chamber portion, and pump means in fluid communication with said inlet and outlet conduit means to provide a positive pressure differential to pump the water-glycol mixture therethrough and thereby minimize concentration of glycol in said heat exchange chamber where water in the mixture vaporizes.

* * * * *